United States Patent [19]

Golya et al.

[11] 4,033,776

[45] July 5, 1977

[54] COMPOSITION OF CERAMIC MATERIAL

[75] Inventors: William R. Golya; John Doornwaard, both of Gibsonia, Pa.

[73] Assignee: Saxonburg Ceramics, Inc., Saxonburg, Pa.

[22] Filed: Aug. 18, 1975

[21] Appl. No.: 605,349

[52] U.S. Cl. ............................................... 106/46
[51] Int. Cl.² ....................................... C04B 33/26
[58] Field of Search ................. 106/45, 46, DIG. 5

[56] References Cited

UNITED STATES PATENTS

| | | | |
|---|---|---|---|
| 1,370,276 | 3/1921 | Buckman et al. | 106/46 |
| 2,908,580 | 10/1959 | Stetson | 106/46 |
| 3,926,602 | 12/1975 | Andrus | 156/39.7 |

*Primary Examiner*—Winston A. Douglas
*Assistant Examiner*—Mark Bell
*Attorney, Agent, or Firm*—Ulle C. Linton

[57] ABSTRACT

A composition of ceramic material, useful for forming seals in apparatus intended to be subjected to high temperatures, for example electrical heating elements, includes kaolin, silica, and zircon, and also calcium, sodium and boron ions, e.g. as frit and borate components, whereby the material remains substantially free of bubbling or foaming during a stage of heating to expand and harden it, and has enhanced properties of impact resistance and resilience.

2 Claims, No Drawings

COMPOSITION OF CERAMIC MATERIAL

BACKGROUND OF THE INVENTION

The field of art to which the invention appertains is the sealing with ceramic material of electrical equipment, and more particularly sealing with ceramic material which can be subjected to high temperatures, for example in electrical heating elements.

It is necessary, with ceramic materials suitable for this purpose, to have an annealing or setting stage during which the material is heated, whilst in the position of use, to cause it to expand and bond itself to the support, and to take on the characteristics of glass.

It is desirable that the ceramic material shall not bubble unduly, and in particular shall not foam away, during the annealing stage, and Underwriters Laboratory specification in this respect is that the material must bubble a minimum 1/16 of an inch.

It is also desirable that the material, after annealing, shall have a relatively high impact resistance, so as to be readily capable of standing up to shocks incurred during use of the electrical equipment.

It is further desirable that the material shall have a relatively high resilience to permit it to stand up to any subsequent forming or other machining operations which may be carried out on the equipment.

SUMMARY OF THE INVENTION

The present invention is based on the introduction of novel constituents into compositions of material for use as ceramic seals.

In the specification of U.S. Pat. No. 2,908,580 issued Oct. 13, 1959 to SAXONBURG CERAMICS as assignor of William C. Stetson there is broadly set forth and claimed a ceramic material of good mechanical and electrical properties that can be readily worked and assembled with elements of electrical equipment, and upon heating expands to seal the space in which it is mounted, thereby to provide electrical insulation in said space, for example when forming electrically insulating end seals in electrical heating elements intended to be subjected to high temperature, said ceramic material consisting of a mixture of 20 to 30% kaolin, 20 to 30% silica, 30 to 40% zirconium silicate, and a flux including the combination of the oxides of sodium, calcium and boron in certain proportions.

It is the primary object of the present invention to provide a material for such purposes which has the property of remaining substantially bubble-free during the annealing stage.

A further and important object of the invention is to provide a material for such purposes which has enhanced physical properties in that it has higher impact resistance and higher resilience than was obtainable hitherto.

A still further and important object of the invention is to provide an improved material particularly suitable for forming an electrically insulating end seal in electrical heating elements, which material after being assembled into the heating element can be subjected to high temperature whereupon it expands and bonds itself to the element, thereby sealing the element and taking on the characteristics of glass.

Further objects of the invention will be in part obvious and in part pointed out in the following description.

A preferred composition of material in accordance with the present invention comprises kaolin, silica, zirconium-containing component, frit component, and boron-containing component, all in the percentage compositions by weight of the ingredients in the mixture, as shown in the following:

kaolin: about 26%
silica: about 25%
zirconium-containing component: about 16%
frit component: about 29%
boron-containing component: about 4%

A typical chemical composition of each of the above ingredients (percentage by weight) is given in the following table:

|                   | Kaolin | Silica | Zircon | Frit  | Borate | Total % |
|-------------------|--------|--------|--------|-------|--------|---------|
| $SiO_2$           | 52.40  | 99.89  |        | 31.49 |        | 47.7280 |
| $Al_2O_3$         | 44.65  | .08    | .30    | 13.20 |        | 15.5050 |
| $Fe_2O_3$         | .44    | .02    | .04    |       |        | .1198   |
| $TiO_2$           | 1.81   | .01    | .20    |       |        | .4763   |
| CaO               | .09    |        |        | 15.80 | 38.22  | 6.1330  |
| MgO               | .19    |        |        |       |        | .0049   |
| $Na_2O$           | .33    |        |        | 7.96  | 9.83   | 2.7874  |
| $K_2O$            | .09    |        |        |       |        | .0023   |
| $B_2O_3$          |        |        |        | 31.55 | 51.94  | 11.2271 |
| $ZrSiO_4$         |        |        | 99.46  |       |        | 15.9130 |

It is thought that the enhanced melt property and the enhanced physical properties arise essentially from the inclusion, of the specific relative quantities of calcium, sodium and boron oxides, in the form of the frit-component and the boron-containing component.

In another embodiment of the ceramic composition of the present invention the constituents are as follows, each being shown as a percentage by weight of the total:

| Kaolin   | = | 26%        |
|----------|---|------------|
| Silica   | = | 36         |
| Zircon   | = | 14         |
| Soda     | = | 3          |
| Lime     | = | 5          |
| Alumina  | = | 5          |
| Borate   | = | 11         |
|          |   | 100% total |

The oxides of sodium, calcium, and boron present in the composition together serve as a flux. Other combinations of the remaining ingredients, and of the flux ingredients, within the prescribed limits can equally as well be employed.

The composition of ceramic material may conveniently be produced by mixing the proper amounts of the ingredients and forming the mixture by conventional manufacturing methods such as dust or dry pressing, wet or hydraulic pressing, extrusion or casting. The ceramic thus produced can be machined into desired shapes, either in the leather hard, semi-moist, or dry condition. The machined product is heated to a suitable temperature, below the eventual annealing temperature, to shrink the product to its maximum density. The composition of ceramic material is then assembled with the elements of the electrical equipment in which it is used, for example an electrical heating element, and is thereafter subjected to a fusion temperature, say about 1800° F. to cause it to expand, and thereafter to a still higher temperature, say about 2000° F. to cause it to fuse and take on the characteristics of glass.

A typical field of use of the composition of ceramic sealing material of this invention is exemplified in U.S.

Pat. No. 2,962,684 issued Nov. 29, 1960 to GENERAL ELECTRIC COMPANY as assignor of Gunder Lien Jr., the disclosure of which is incorporated in the present application by reference, and wherein FIGS. 1 to 5 of the drawings illustrate a sheathed electric heating unit including seals denoted by reference numerals 16 and 17 and each essentially comprising a hollow plug of substantially homogeneous cellular and porous ceramic material, the plug being intimately bonded to the adjacent inner surface of a sheathing component and also intimately bonded to the adjacent outer surface of an intermediate portion of a terminal, the extreme outer end of each plug being dense, glazed, and defining a convex meniscus extending outwardly beyond the adjacent extreme end of the sheath, whereby the plugs prevent escape of magnesia from the sheath. If the seals 16,17 are made of the improved ceramic composition of this invention, the material of the plugs does not bubble during initial heating, and after the final heating for formation of a glass-like seal the material has high impact strength and high resilience.

The composition and method of forming the same are capable of considerable modification, and such changes thereto as come within the scope of the appended claims are deemed to be parts of the invention.

I claim:

1. A ceramic composition for forming an expanded glass-like seal upon heating, comprising about 26% kaolin, about 25% silica, about 16% zircon, about 29% of frit, about 4% of borate, by weight of the whole, the chemical composition of said components being as shown in the following table, in percentages by weight:

|  | Kaolin | Silica | Zircon | Frit | Borate |
|---|---|---|---|---|---|
| $SiO_2$ | 52.40 | 99.89 |  | 31.49 |  |
| $Al_2O_3$ | 44.65 | .08 | .30 | 13.20 |  |
| $Fe_2O_3$ | .44 | .02 | .04 |  |  |
| $TiO_2$ | 1.81 | .01 | .20 |  |  |
| CaO | .09 |  |  | 15.80 | 38.22 |
| MgO | .19 |  |  |  |  |
| $Na_2O$ | .33 |  |  | 7.96 | 9.83 |
| $K_2O$ | .09 |  |  |  |  |
| $B_2O_3$ |  |  |  | 31.55 | 51.94 |
| $ZrSiO_4$ |  |  | 99.46 |  |  |

2. A ceramic composition for forming an expanded glass-like seal upon heating, comprising about 26% kaolin, about 25% silica, about 16% ziron, about 29% of frit, about 4% of borate, by weight of the whole, said ceramic composition having the following percentages by weight:

| | |
|---|---|
| $SiO_2$ | 47.72% |
| $Al_2O_3$ | 15.50% |
| $Fe_2O_3$ | .11% |
| $TiO_2$ | .47% |
| CaO | 6.13% |
| MgO | .004% |
| $Na_2O$ | 2.78% |
| $K_2O$ | .002% |
| $B_2O_3$ | 11.22% |
| $ZrSiO_4$ | 15.91% |

* * * * *